(12) United States Patent
Costanza et al.

(10) Patent No.: US 8,376,277 B2
(45) Date of Patent: Feb. 19, 2013

(54) LARGE AIRCRAFT SELF-DEFENSE SYSTEM INSTALLATION CONFIGURATION

(75) Inventors: John E. Costanza, Maple Valley, WA (US); Richard A. Sellers, Renton, WA (US)

(73) Assignee: The Boeing Company, Chicago, IL (US)

( * ) Notice: Subject to any disclaimer, the term of this patent is extended or adjusted under 35 U.S.C. 154(b) by 1255 days.

(21) Appl. No.: 11/867,194

(22) Filed: Oct. 4, 2007

(65) Prior Publication Data
US 2008/0105111 A1 May 8, 2008

Related U.S. Application Data (60) Provisional application No. 60/828,206, filed on Oct. 4, 2006.

(51) Int. Cl.
*B64D 7/00* (2006.01)
*F41H 13/00* (2006.01)
*B64C 1/36* (2006.01)

(52) U.S. Cl. ............ 244/121; 244/1 R; 244/129.1; 89/1.11

(58) Field of Classification Search .......... 244/118.1, 244/118.2, 121, 129.1, 1 R; 89/1.11; 342/13–20, 342/52, 54, 61, 67
See application file for complete search history.

(56) References Cited

U.S. PATENT DOCUMENTS

| 5,600,434 | A  | * | 2/1997 | Warm et al. .......... 356/139.08 |
| 5,806,789 | A  | * | 9/1998 | Boulware et al. .......... 244/1 R |
| 5,927,648 | A  | * | 7/1999 | Woodland .......... 244/118.1 |
| 6,616,097 | B2 | * | 9/2003 | Hilbert .......... 244/118.1 |
| 6,873,893 | B1 | * | 3/2005 | Sanghera et al. .......... 701/49 |
| 6,929,214 | B2 | * | 8/2005 | Ackleson et al. .......... 244/1 R |
| 7,324,747 | B2 | * | 1/2008 | Kempas .......... 396/12 |
| 7,378,626 | B2 | * | 5/2008 | Fetterly .......... 244/3.1 |
| 7,520,467 | B2 | * | 4/2009 | Gioffre et al. .......... 244/118.1 |
| 7,688,247 | B2 | * | 3/2010 | Anschel et al. .......... 342/14 |
| 2008/0088496 | A1 | * | 4/2008 | Thum-Jaeger et al. .......... 342/14 |

FOREIGN PATENT DOCUMENTS

DE      4402855 A1 *  8/1995
WO  WO 2005045465 A1 *  5/2005

* cited by examiner

*Primary Examiner* — Joseph W Sanderson
(74) *Attorney, Agent, or Firm* — Felix L. Fischer (57) ABSTRACT

An integrated sensor and self defense system for large aircraft incorporates a forward looking missile warning sensor (MWS) mounted in a replacement panel for mounting in an un-pressurized aft compartment, an aft looking MWS mounted in the panel substantially adjacent the forward looking MWS, and a laser system for engaging a missile detected by an MWS mounted proximate the forward and aft looking MWS. A processor and electronics for controlling said MWS and laser systems are mounted adjacent the active components with indicators and operator control systems mounted in the aircraft cockpit.

17 Claims, 7 Drawing Sheets

LARGE AIRCRAFT SELF-DEFENSE SYSTEM INSTALLATION CONFIGURATION

REFERENCE TO RELATED APPLICATIONS

This application claims priority of U.S. Provisional Application Ser. No. 60/828,206 filed on Oct. 4, 2006 having the same title as the present application, the entire content of which is hereby incorporated by reference.

STATEMENT REGARDING FEDERALLY SPONSORED RESEARCH OR DEVELOPMENT

This invention was developed partially with government funding pursuant to USAF/AFMC contract no. F33657-01-D0013. The United States government has certain rights in the invention disclosed herein.

FIELD

This invention relates generally to the field of aircraft self defense systems and more particularly to a system and installation configuration for improved collocated sensor positioning and reduced system complexity for Infrared missile alert and self defense capability in large aircraft.

BACKGROUND

Man portable air defense systems (MANPADS) as well as other anti-aircraft missile systems are becoming an increasingly prominent threat to large aircraft, both in the commercial transportation market and other large aircraft operations. To counteract these threats, self Defense Systems have been placed on several aircraft configurations with the missile warning sensors spread out at the extremities of the aircraft body. Typically for large aircraft there are two sensors in the front, typically mounted under the chin of the fuselage, two in the tail and one in the belly to obtain necessary field of view. Self defense for such aircraft employs laser and flare system to defeat a missile threat detected by the sensors. In exemplary systems a single laser is used in the tail section of the aircraft combined with the use flares to improve effectiveness. Aircraft with multiple lasers typically have one or two in the tail and others positioned either on the sides or belly of the aircraft.

The installation complexity created by requiring multiple positions on the aircraft for sensors and lasers is exacerbated in large aircraft, particularly aircraft derived from commercial base platforms where significant modification must be accomplished at each of the sensor or component locations particularly in view of the pressurization requirements for such aircraft. Additionally, mounting of sensors under the chin of the aircraft creates aerodynamic issues including noise generation. Pods or external fairings mounted to the belly of the aircraft containing all the components have been proposed, but pods for many large aircraft application are less effective and more expensive than integrated systems and may affect aircraft performance. Additionally, wheels up landing issues are associated with a belly mounted pod or external fairing.

It is therefore desirable to simplify and integrate sensor and laser self defense systems in a common package. It is also desirable to provide a self defense system with reduced weight and simplified pressurization issues by locating the equipment in the un-pressurized section of the aircraft. It is also desirable to provide a system which eliminates aerodynamic noise associated with chin mounted sensors.

SUMMARY

The embodiments presented herein provide an integrated self defense system for large aircraft which is locatable in an aft un-pressurized compartment of the fuselage. The large aircraft self defense system incorporates a forward looking missile warning sensor (MWS) mounted in a replacement panel for mounting in the un-pressurized aft compartment, an aft looking MWS mounted in the panel substantially adjacent the forward looking MWS, and a laser system for engaging a missile detected by an MWS mounted proximate the forward and aft looking MWS. A processor and electronics for controlling said MWS and laser systems is mounted adjacent the active components with indicators and operator control systems mounted in the aircraft cockpit.

BRIEF DESCRIPTION OF THE DRAWINGS

These and other features and advantages of the disclosed embodiments will be better understood by reference to the following detailed description when considered in connection with the accompanying drawings wherein.

DETAILED DESCRIPTION

Figure 1:
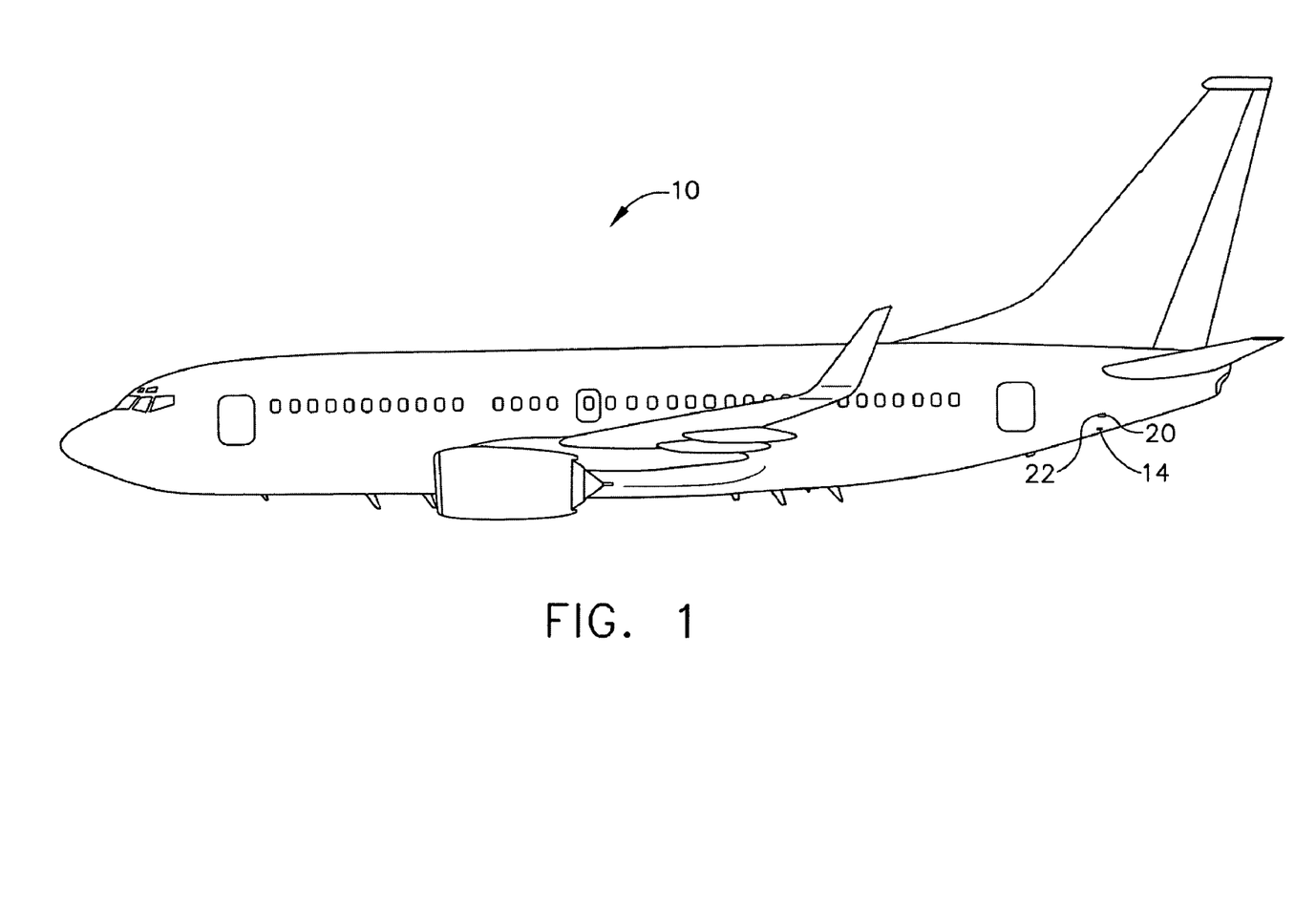
FIG. 1 is a side view of an exemplary large aircraft on which a system according to the present invention is employed.
Figure 2:
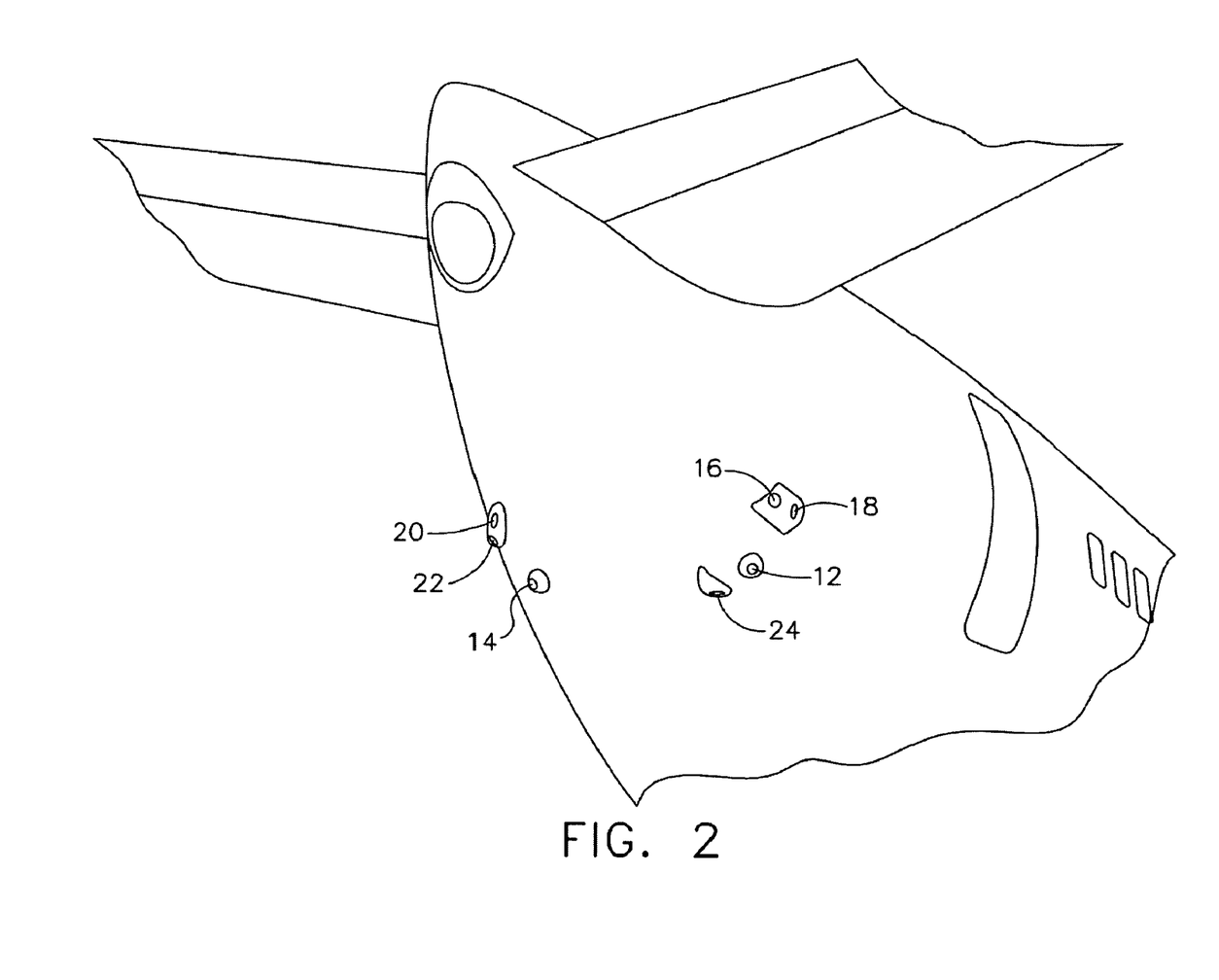
FIG. 2 is rear perspective view of the aircraft of FIG. 1 showing the external positioning of elements of the system.

The embodiments shown in the drawings provide a simplified integrated system located just aft of the aft pressure bulkhead in an area that is typically an un-pressurized bay in most large aircraft configurations. As shown in FIGS. 1 and 2, the system installed in an exemplary Boeing 737 aircraft 10 employs two lasers 12 and 14. However, this is not considered limiting since one or more embodiments of the present invention may be installed in a large number of both commercial and military aircraft, from various manufacturers, where the aircraft may be larger than, equivalent in size or capacity, or smaller than the exemplary aircraft. The lasers are positioned at the 5 and 7 o'clock position to provide good line of sight for engagement of a hostile missile attacking the aircraft. Missile warning sensors 16, 18, 20, 22 and 24 are located as close as possible to the lasers to provide nearly the same view.

Figure 3:
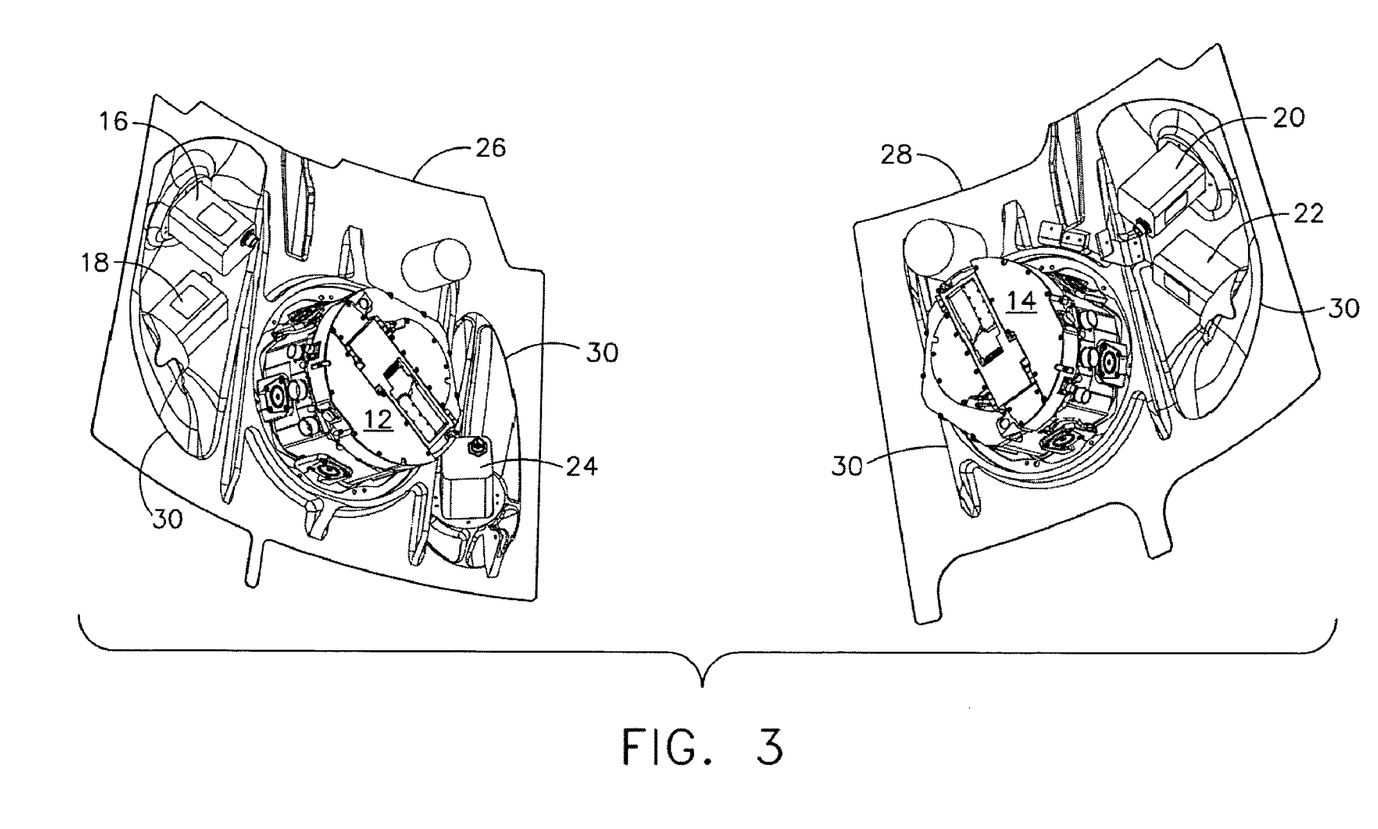
FIG. 3 is a top perspective view looking aft of the integrated panels incorporating the elements of the system incorporating the present invention.

The system incorporating the present invention is mounted on two integrated panels 26 and 28 as seen in FIG. 3. The self contained panels each provide mounting for a forward looking missile warning sensor (MWS) 18 and 22 and a rearward looking MWS 16 and 20. For an exemplary embodiment, the MWS units are ultraviolet detector systems. In alternative embodiments two color infrared systems are employed. A laser turret such as a Guardian™Laser Turret Assembly (GLTA) is mounted in each panel for each of the lasers 12 and 14. The GLTA is a laser system for directional infrared countermeasures (DIRCM) applications to engage and defeat sophisticated heat-seeking missiles for aircraft protection. The MWS units provide ultraviolet detection capability for a variety of missile threats. The GLTA and MWS elements in the embodiment disclosed herein are provided by as a Northrop Grumman AN/AAQ-24(V)20 NEMESIS system. The complete system consists of the GLTA, missile warning sensors, processor, and Control Interface Unit.

A portion of the aircraft fuselage skin and structure is removed for insertion of the panels (26, 28). The panels are provided with integral structural supports 30 which integrate with structural elements in the fuselage of the aircraft to maintain structural integrity and mounting provisions for GLTA and MWS. Each panel fitting contains integral doublers, stringers, stiffeners, and wiring provisions. The panels in the exemplary embodiment shown are of machined aluminum construction with alternative embodiments employing composite construction. The panels mounted between frames in the aft compartment to simplify structural installation. The system arrangement of the present invention reduces part count and simplifies installation in the aircraft.

For the embodiment shown in FIG. 3 of the drawings, starboard panel 26 incorporates a downward looking MWS 24 to complete the desirable FOV compliment for the system.

Figure 4:
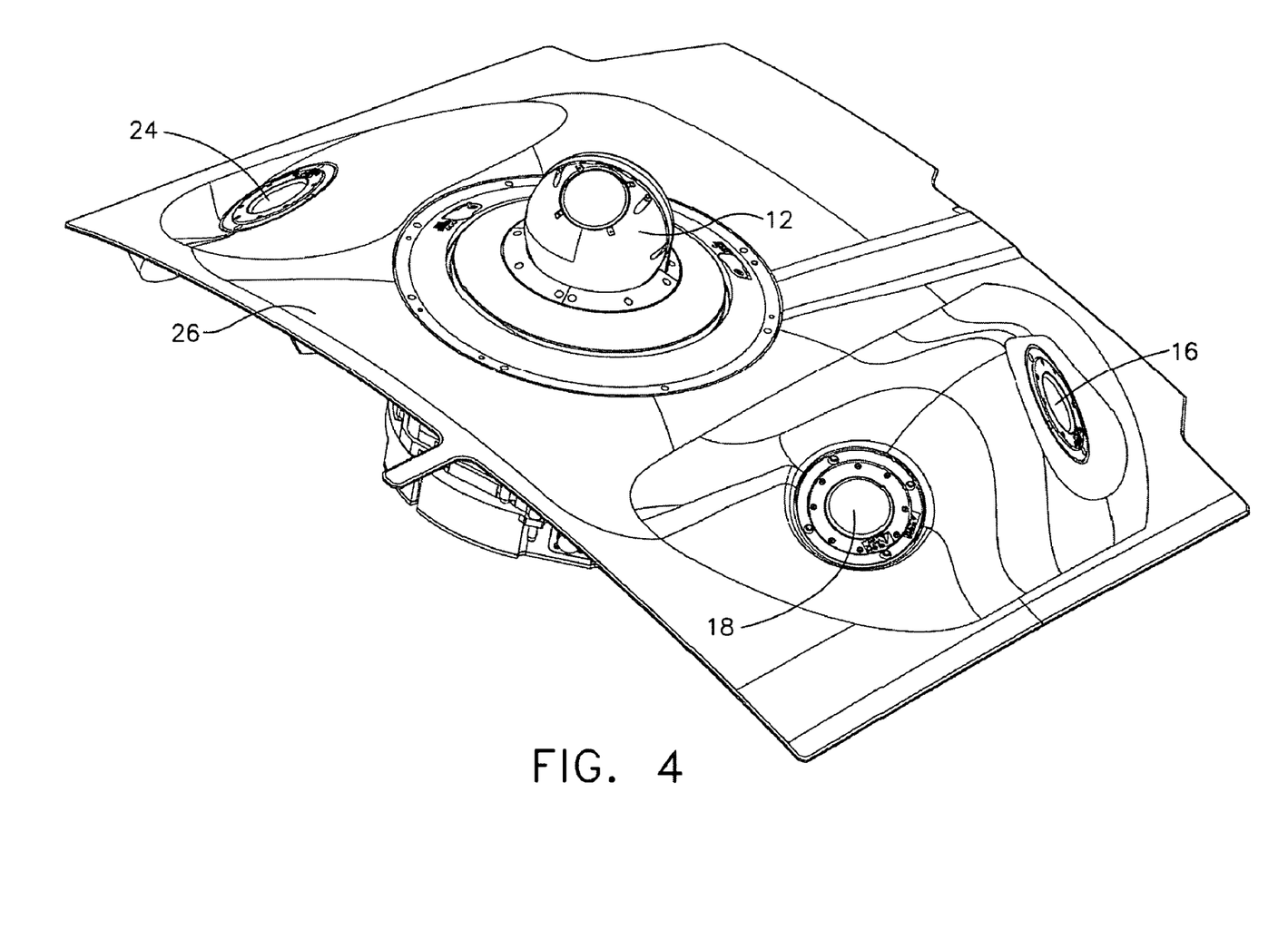
FIG. 4 is a bottom perspective view looking forward of the starboard integrated panel of FIG. 3.

Mounting of the forward and rearward looking MWSs as shown in FIG. 4 is accomplished at a 45° offset from the aircraft centerline provides a 0° to 180° FOV for the sensor combination. The GLTA mounting in close proximity to and intermediate the forward/aft MWS pair and downward looking MWS 24 reduces targeting offset issues between the sensors and laser system and eliminates the need for a chin mounted sensor while providing complete FOV coverage.

Figure 5:
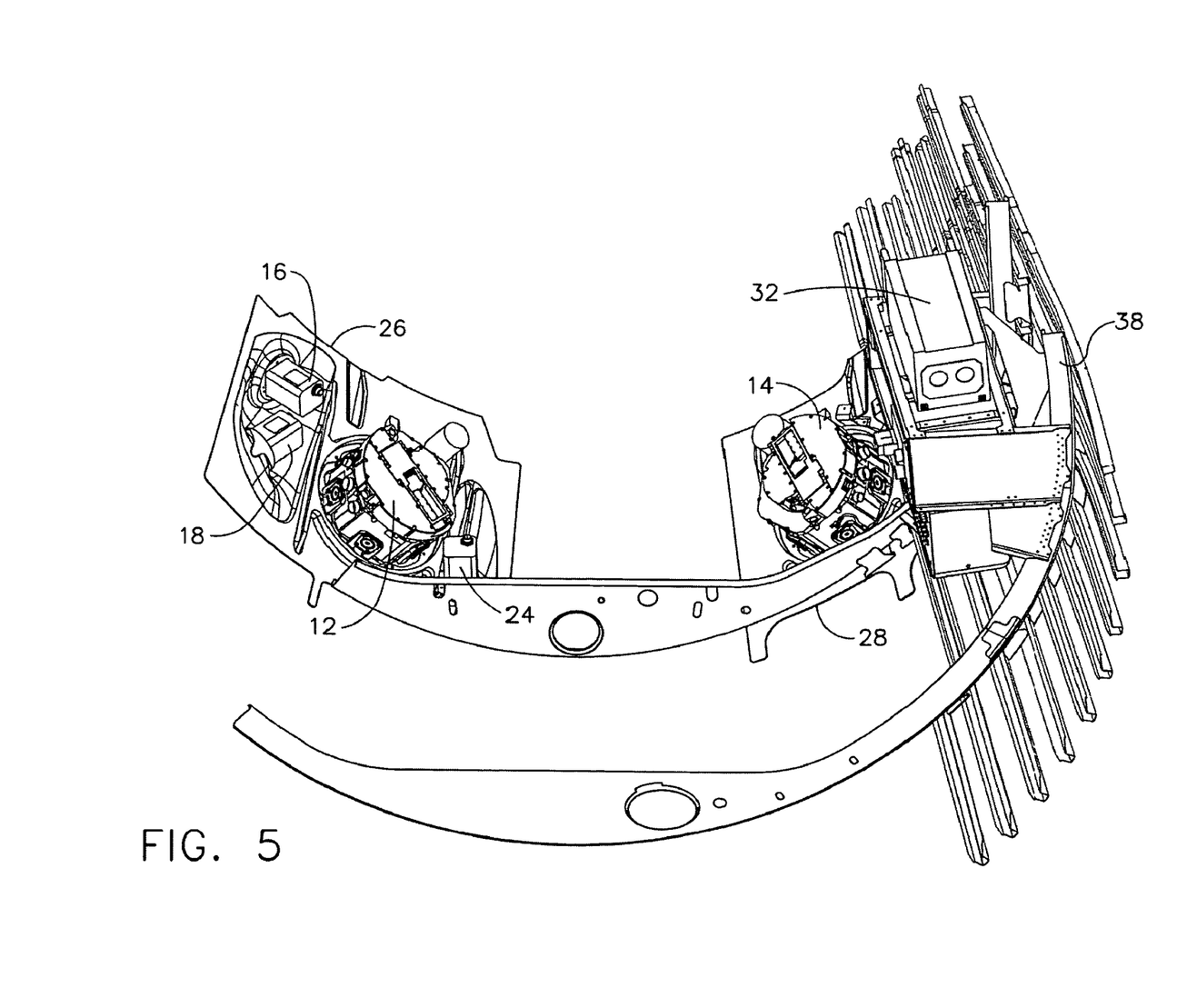
FIG. 5 is a rearward view of the un-pressurized aft compartment in the tail of the aircraft of FIGS. 1 and 2 showing the positioning of the integrated system incorporating the invention.

The panels of the present invention are shown installed in the aircraft in FIG. 5. The integrated panel set mounts without impinging on other component envelopes.

Figure 6:
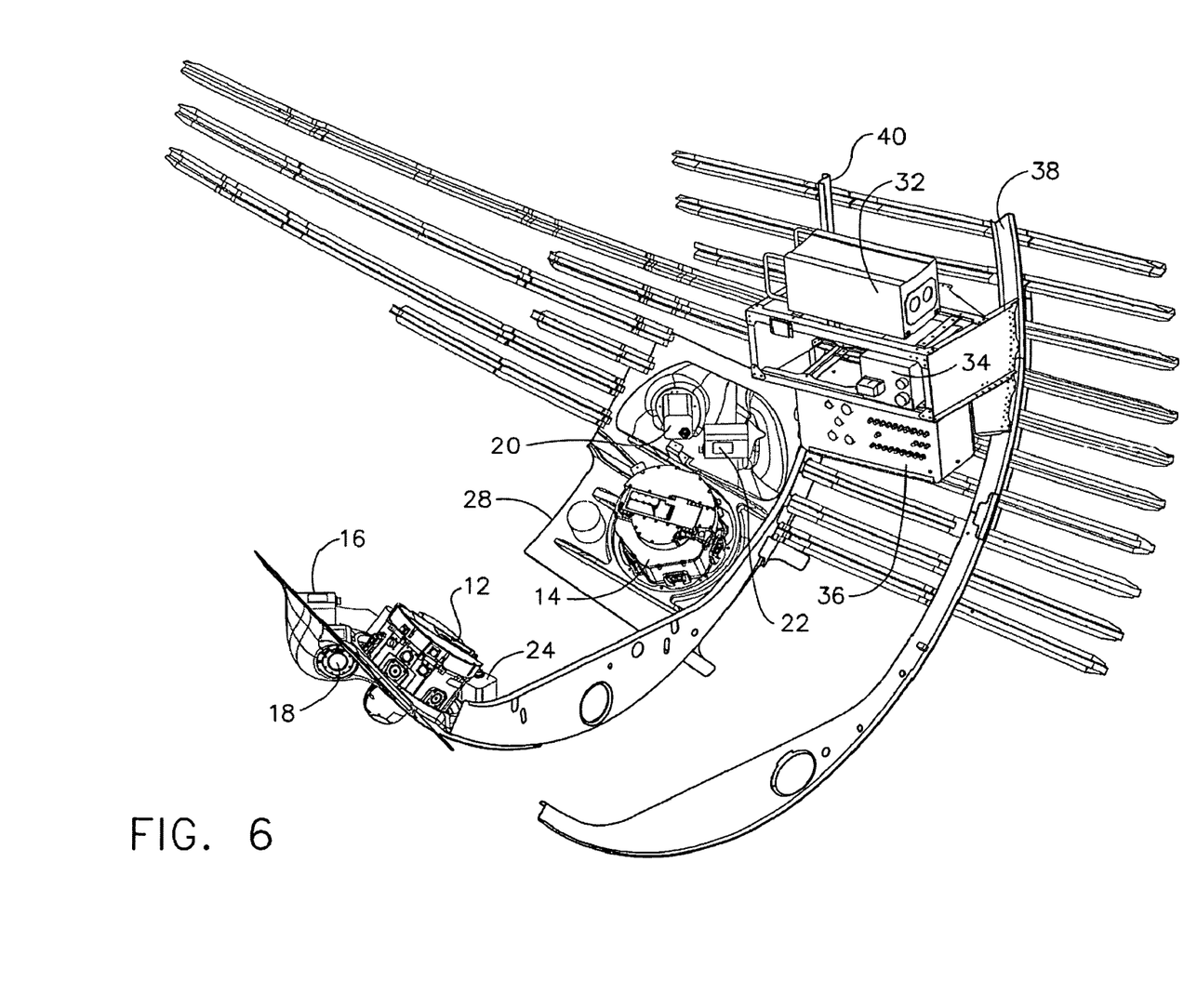
FIG. 6 is a view of one of the panel installation of the system as shown in FIG. 5 looking aft and to the port side of the aircraft.

As shown in FIG. 6, processor 32 and associated electrical equipment including a transformer rectifier unit (TRU) 34 for operation and control of the system are located right next to the lasers and sensors providing a compact, light weight, low cost installation. Mounting is easily accomplished using a sheet metal shelf structure 36 which spans two frames 38 and 40 in the aircraft fuselage and forms integral J-Box.

For the exemplary embodiment shown in the drawings, two separate panels are employed. In alternative embodiments with volume available at the center line of the aircraft, a single panel incorporating the operational elements of the system is employed.

Figure 7:
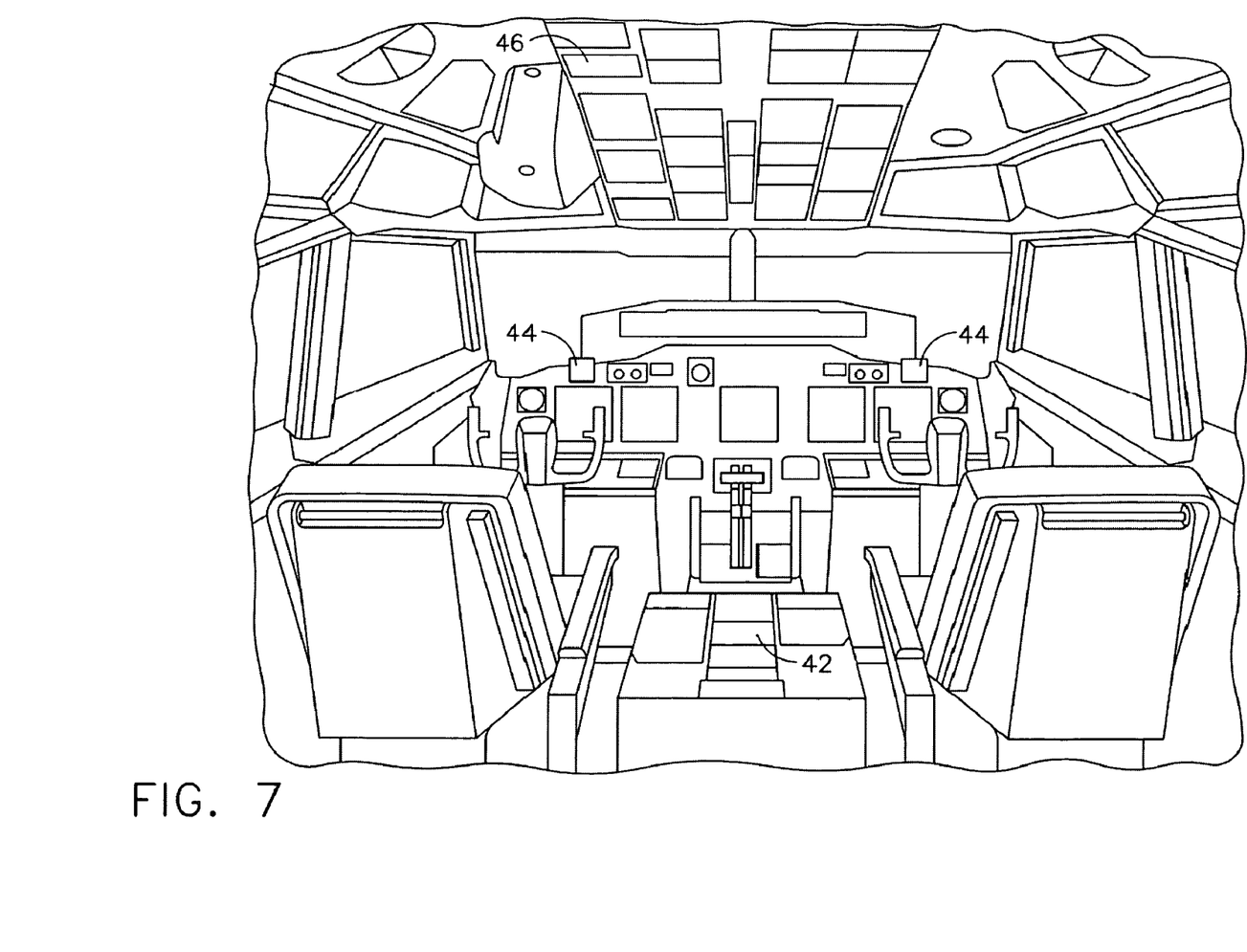
FIG. 7 is a view of an exemplary layout of control and monitoring elements in an aircraft cockpit instrument panel for a system incorporating the present invention. As used herein, the term exemplary indicates an example and not necessarily an ideal.

In an exemplary implementation of the system, a Control Indicator Unit 42 is mounted in the center console of the aircraft cockpit and visual alerts 44 are located on the instrument panel to provide easy operation. A control panel 46 is provided in the overhead system for activating the system.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A large aircraft self defense system comprising:
   at least one forward looking missile warning sensor (MWS) and at least one rearward looking MWS proximate the at least one forward looking MWS mounted in an aircraft outer skin replacement panel for an un-pressurized aft compartment of a fuselage, said skin replacement panel offset from an aircraft centerline;
   a laser system mounted proximate said at least one forward looking MWS and said at least one rearward looking MWS for defeating a missile detected by one of said at least one forward looking MWS and said at least one rearward looking MWS; and,
   means for controlling said MWSs and laser system.

2. A large aircraft self defense system as defined in claim 1 wherein the laser system is mounted in the replacement panel.

3. A large aircraft self defense system as defined in claim 2 further comprising a downward looking MWS mounted in the replacement panel.

4. A large aircraft self defense system as defined in claim 2 further comprising:
   a second forward looking MWS mounted in a second replacement panel for mounting in the un-pressurized aft compartment said second skin replacement panel offset from the aircraft centerline;
   a second aft looking MWS mounted in the second replacement panel substantially adjacent the second forward looking MWS; and,
   a second laser system for engaging a missile detected by one of said second forward looking MWS and said second aft looking MWS, said second laser system mounted proximate the second forward MWS and second aft looking MWS.

5. A large aircraft self defense system as defined in claim 2 wherein the replacement panel incorporates integral structural elements for engagement of structural elements adjacent a removed section of fuselage structure receiving the replacement panel.

6. A large aircraft self defense system as defined in claim 2 wherein the means for controlling includes a processor mounted proximate the replacement panel on a shelf structure in the un-pressurized aft compartment.

7. A large aircraft comprising:
   a fuselage having an un-pressurized aft compartment;
   a forward looking missile warning sensor (MWS) mounted in a fuselage skin panel for mounting in the lower quadrant of the un-pressurized aft compartment offset from a centerline of the fuselage;
   an aft looking MWS mounted in the skin panel substantially adjacent the forward looking MWS;
   a laser countermeasures system for defeating a missile detected by one of said forward looking MWS and said aft looking MWS mounted proximate the forward and aft looking MWS; and,
   means for controlling said forward looking MWS, rearward looking MWS and laser systems.

8. An aircraft as defined in claim 7 further comprising a downward looking MWS mounted in the panel.

9. An aircraft as defined in claim 7 further comprising:
   a second forward looking MWS mounted in a second panel in the un-pressurized aft compartment offset from the centerline of the fuselage;
   a second aft looking MWS mounted in the second panel substantially adjacent the second forward looking MWS; and,
   a second laser system for engaging a missile detected by one of said second forward looking MWS and said second aft looking MWS mounted proximate the second forward and second aft looking MWSs.

10. An aircraft as defined in claim 7 wherein the skin panel incorporates integral structural elements for engagement of structural elements of fuselage structure receiving the skin panel as a replacement for a removed skin panel.

11. An aircraft as defined in claim 7 wherein the means for controlling includes a processor mounted on a shelf structure in the un-pressurized aft compartment proximate the skin panel.

12. A large aircraft self defense system comprising:
   a forward looking missile warning sensor (MWS) mounted in an aircraft outer skin replacement panel for an un-pressurized aft compartment offset from an aircraft centerline;
   a rearward looking MWS mounted in the replacement panel adjacent the forward looking MWS;
   a laser system mounted in the replacement panel proximate said looking MWS and said rearward looking MWS for defeating a missile detected by one of said forward looking MWS and said rearward looking MWS;
   a second forward looking MWS mounted in a second replacement panel for mounting in the un-pressurized aft compartment offset from the aircraft centerline;
   a second aft looking MWS mounted in the second panel adjacent the second forward looking MWS; and,
   a second laser system mounted in the second replacement panel proximate the second forward looking MWS and the second aft looking MWS for engaging a missile detected by one of said second forward looking MWS and said second aft looking MWS, and,
   a processor mounted on a shelf structure proximate the first and second replacement panels in the un-pressurized aft compartment for controlling said forward looking MWS, aft looking MWS, second forward looking MWS, second aft looking MWS and said first and second laser systems.

13. A large aircraft self defense system as defined in claim 12 wherein the first and second replacement panel each incorporate integral structural elements for engagement of structural elements adjacent a removed section of fuselage structure receiving the respective replacement panel.

14. The large aircraft self defense system as defined in claim 12 wherein the first and second replacement panels are offset from the aircraft centerline by 45°.

15. A large aircraft self defense system comprising:
   an aircraft outer skin replacement panel incorporating integral structural elements for engagement of elements of adjacent fuselage structure for an un-pressurized aft compartment having a skin panel section offset from an aircraft centerline removed to receive the replacement panel;
   a forward looking missile warning sensor (MWS) mounted in the replacement panel;
   a rearward looking MWS mounted in the replacement panel adjacent the forward looking MWS;
   a laser system mounted in the replacement panel proximate said looking MWS and said rearward looking MWS for defeating a missile detected by one of said forward looking MWS and said rearward looking MWS; and,
   a processor mounted proximate the replacement panels in the un-pressurized aft compartment for controlling said forward looking MWS, aft looking MWS and said laser system.

16. A large aircraft self defense system as defined in claim 15 further comprising:
   a second aircraft outer skin replacement panel incorporating integral structural elements for engagement of elements of adjacent fuselage structure for a second skin panel section offset from the aircraft centerline removed from the un-pressurized aft compartment to receive the second replacement panel;
   a second forward looking missile warning sensor (MWS) mounted in the second replacement panel;
   a second rearward looking MWS mounted in the second replacement panel adjacent the second forward looking MWS;
   a second laser system mounted in the second replacement panel proximate said second forward looking MWS and said second rearward looking MWS for defeating a missile detected by one of said second forward looking MWS and said second rearward looking MWS; wherein said processor further controls said second forward looking MWS, second aft looking MWS and said second laser system.

17. The large aircraft self defense system as defined in claim 16 wherein the first and second replacement panels are offset from the aircraft centerline by 45°.

* * * * *